United States Patent [19]
Ryan

[11] Patent Number: 5,694,572
[45] Date of Patent: Dec. 2, 1997

[54] CONTROLLABLY OPERABLE METHOD AND APPARATUS FOR PREDICTING ADDRESSES OF FUTURE OPERAND REQUESTS BY EXAMINATION OF ADDRESSES OF PRIOR CACHE MISSES

[75] Inventor: Charles P. Ryan, Phoenix, Ariz.

[73] Assignee: Bull HN Information Systems Inc., Billerica, Mass.

[21] Appl. No.: 841,687

[22] Filed: Feb. 26, 1992

Related U.S. Application Data

[63] Continuation-in-part of Ser. No. 364,943, Jun. 12, 1989, Pat. No. 5,093,777.
[51] Int. Cl.⁶ ............................................. G06F 13/00
[52] U.S. Cl. ..................... 395/445; 395/403; 395/800
[58] Field of Search ............................ 395/400, 425, 395/725, 800, 375, 445, 403; 382/1, 19

[56] References Cited

U.S. PATENT DOCUMENTS

| | | | |
|---|---|---|---|
| 5,093,777 | 3/1992 | Ryan | 395/400 |
| 5,185,861 | 2/1993 | Valencia | 395/425 |
| 5,269,013 | 12/1993 | Abramson et al. | 395/425 |
| 5,305,389 | 4/1994 | Palmer | 395/425 |
| 5,367,656 | 11/1994 | Ryan | 395/425 |

OTHER PUBLICATIONS

IBM Technical Disclosure Bulletin, "New Context Bit", IBM Technical Disclosure Bulletin, vol. 30, No. 2, Jul. 1987.

*Primary Examiner*—Mehmet B. Geckil
*Attorney, Agent, or Firm*—J. S. Solakian; J. H. Phillips

[57] ABSTRACT

In a data processing system which employs a cache memory feature, a method and exemplary special purpose apparatus for practicing the method are disclosed to lower the cache miss ratio for called operands. Recent cache misses are stored in a first in, first out miss stack, and the stored addresses are searched for displacement patterns therea­mong. Any detected pattern is then employed to predict a succeeding cache miss by prefetching from main memory the signal identified by the predictive address. The apparatus for performing this task is preferably hard wired for speed purposes and includes subtraction circuits for evaluating variously displaced addresses in the miss stack and com­parator circuits for determining if the outputs from at least two subtraction circuits are the same indicating a pattern yielding information which can be combined with an address in the stack to develop a predictive address. The cache miss prediction mechanism is only selectively enabled during cache "in-rush" following a process change to increase the recovery rate; thereafter, it is disabled, based upon timing-out a timer or reaching a hit ratio threshold, in order that normal procedures allow the hit ratio to stabilize at a higher percentage than if the cache miss prediction mechanism were operated continuously.

27 Claims, 3 Drawing Sheets

CONTROLLABLY OPERABLE METHOD AND APPARATUS FOR PREDICTING ADDRESSES OF FUTURE OPERAND REQUESTS BY EXAMINATION OF ADDRESSES OF PRIOR CACHE MISSES

CROSS REFERENCE TO RELATED APPLICATION

This is a Continuation-in-Part of U.S. patent application Ser. No. 07/364,943, filed Jun. 12, 1989, for CACHE MISS PREDICTION METHOD AND APPARATUS by Charles P. Ryan, now U.S. Pat. No. 5,093,777.

FIELD OF THE INVENTION

This invention relates to the art of data processing systems which include a cache memory feature and, more particularly, to a method and apparatus for selectively predicting memory cache misses for operand calls and using this information to transfer data from a main memory to cache memory to thereby lower the cache miss ratio.

BACKGROUND OF THE INVENTION

The technique of employing a high speed cache memory intermediate a processor and a main memory to hold a dynamic subset of the information in the main memory in order to speed up system operation is well known in the art. Briefly, the cache holds a dynamically variable collection of main memory information fragments selected and updated such that there is a good chance that the fragments will include instructions and/or data required by the processor in upcoming operations. If there is a cache "hit" on a given operation, the information is available to the processor much faster than if main memory had to be accessed to obtain the same information. Consequently, in many high performance data processing systems, the "cache miss ratio" is one of the major limitations on the system execution rate, and it should therefore be kept as low as possible.

The key to obtaining a low cache miss ratio is obviously one of carefully selecting the information to be placed in the cache from main memory at any given instant. There are several techniques for selecting blocks of instructions for transitory residence in the cache, and the more or less linear use of instructions in programming renders these techniques statistically effective. However, the selection of operand information to be resident in cache memory at a given instant has been much less effective and has been generally limited to transferring one or more contiguous blocks including a cache miss address. This approach only slightly lowers the cache miss ratio and is also an ineffective use of cache capacity.

Thus, those skilled in the art will understand that it would be highly desirable to provide means for selecting operand information for transitory storage in a cache memory in such a manner as to significantly lower the cache miss ratio. That end was accomplished in accordance with the invention disclosed and claimed in U.S. Pat. application No. 364,943, filed Jun. 12, 1989, now U.S. Pat. No. 5,093,777 by special purpose apparatus in the cache memory which stores recent cache misses and searches for operand patterns therein. Any detected operand pattern is then employed to anticipate a succeeding cache miss by prefetching from main memory the block containing the predicted cache miss.

It has been determined, however, that under certain operating conditions, the full time use of the foregoing procedure can actually raise the long term miss ratio (i.e., lower the long term hit ratio).

In a typical cache based processor that executes a single process during a given period, the cache hit ratio will stabilize after some time interval following the institution of the process. If a change to another process is made, new instructions and data must be loaded into the cache such that cache hit ratio instantaneously drops dramatically and then increases as the new process is "experienced". If the cache miss prediction mechanism is in operation, the initial rate of increase in the cache hit ratio is much faster. However, the hit ratio never reaches the level it would reach in the long term if the cache miss prediction mechanism was not in use. This result is caused by the fact that the cache miss prediction mechanism continues to find and load from main memory the next possible miss which, however, is not used, thus forcing the cache to replace blocks that are more important.

The invention disclosed and claimed herein overcomes the limiting effect of using the cache miss prediction mechanism continuously after a process has been changed.

OBJECTS OF THE INVENTION

It is therefore a broad object of this invention to provide an improved cache memory in a data processing system.

It is another object of this invention to provide a cache memory particularly characterized by exhibiting a lower cache miss ratio in operation.

It is a more specific object of this invention to provide a cache memory selectively incorporating circuitry for effectively predicting cache misses during an "in-rush" period following a process change.

SUMMARY OF THE INVENTION

Briefly, these and other objects of the invention are achieved by special purpose apparatus which stores recent cache misses and searches for address patterns therein. Any detected pattern is then employed to anticipate a succeeding cache miss by prefetching from main memory the block containing the predicted cache miss. The cache miss prediction mechanism is only selectively enabled during cache "in-rush" following a process change to increase the recovery rate; thereafter, it is disabled, based upon timing-out a timer or reaching a hit ratio threshold, in order that normal procedures allow the hit ratio to stabilize at a higher percentage than if the cache miss prediction mechanism were operated continuously.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

Figure 1:
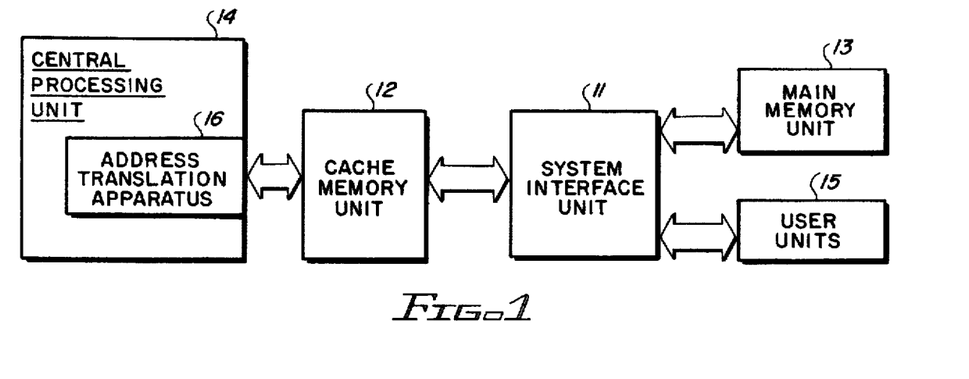
FIG. 1 is a generalized block diagram of a typical data processing system employing a cache memory and therefore constituting an exemplary environment for practicing the invention.

Referring now to FIG. 1, there is shown a high level block diagram for a data processing system incorporating a cache memory feature. Those skilled in the art will appreciate that this block diagram is only exemplary and that many variations on it are employed in practice. Its function is merely to provide a context for discussing the subject invention. Thus, the illustrative data processing system includes a main memory unit 13 which stores the data signal groups (i.e., information words, including instructions and operands) required by a central processing unit 14 to execute the desired procedures. Signal groups with an enhanced probability for requirement by the central processing unit 14 in the near term are transferred from the main memory unit 13 (or a user unit 15) through a system interface unit 11 to a cache memory unit 12. (Those skilled in the art will understand that, in some data processing system architectures, the signal groups are transferred over a system bus, thereby requiring an interface unit for each component interacting with the system bus.) The signal groups are stored in the cache memory unit 12 until requested by the central processing unit 14. To retrieve the correct signal group, address translation apparatus 16 is typically incorporated to convert a virtual address (used by the central processing unit 14 to identify the signal group to be fetched) to the real address used for that signal group by the remainder of the data processing system to identify the signal group.

The information stored transiently in the cache memory unit 12 may include both instructions and operands stored in separate sections or stored homogeneously. Preferably, in the practice of the present invention, instructions and operands are stored in separate (at least in the sense that they do not have commingled addresses) memory sections in the cache memory unit 12 inasmuch as it is intended to invoke the operation of the present invention as to operand information only.

The cache miss prediction mechanism which is a feature of the invention is based on recognizing and taking advantage of sensed patterns in cache misses resulting from operand calls. In an extremely elementary example, consider a sensed pattern in which three consecutive misses ABC are, in fact, successive operand addresses with D being the next successive address. This might take place, merely by way of example, in a data manipulation process calling for successively accessing successive rows in a single column of data. If this pattern is sensed, the likelihood that signal group D will also be accessed, and soon, is enhanced such that its prefetching into the cache memory unit 12 is in order.

Figure 2:
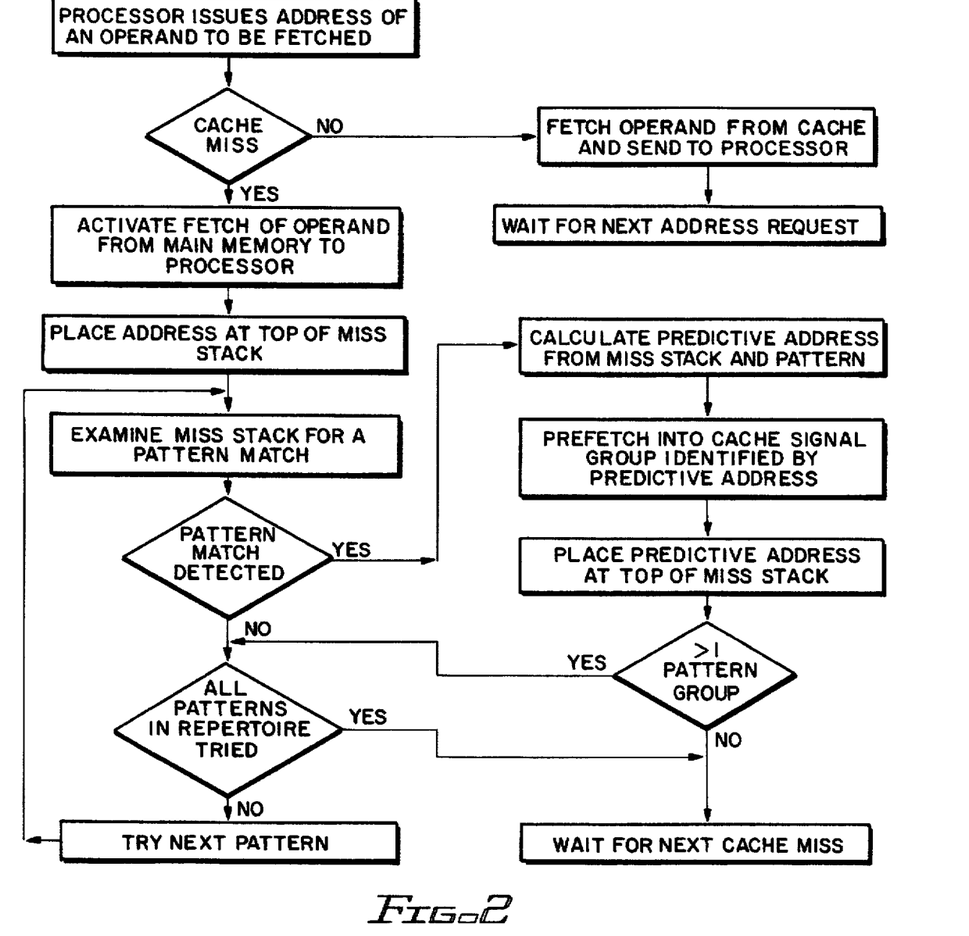
FIG. 2 is a flow diagram illustrating, in simplified form, the sequence of operations by which the address prediction feature of the invention is practiced.

The fundamental principles of the cache miss prediction mechanism are set forth in the operational flow chart of FIG. 2. When a processor (or other system unit) asks for an operand, a determination is made as to whether or not the operand is currently resident in the cache. If so, there is a cache hit (i.e., no cache miss), the operand is sent to the requesting system unit and the next operand request is awaited. However, if there is a cache miss, the request is, in effect, redirected to the (much slower) main memory.

Those skilled in the art will understand that the description to this point of FIG. 2 describes cache memory operation generally. In the context of the present invention, however, the address of the cache miss is meaningful. It is therefore placed at the top of a miss stack, which stack will be described in further detail below. The miss stack (which contains a history of the addresses of recent cache misses in consecutive order) is then examined to determine if a first of several patterns is present. This first pattern might be, merely byway of example, contiguous addresses for the recent cache misses. If the first pattern is not sensed, additional patterns are tried. Merely by way of example again, a second pattern might be recent cache misses calling for successive addresses situated two locations apart. So long as there is no pattern match, the process continues through the pattern repertoire. If there is no match when all patterns in the repertoire have been examined, the next cache miss is awaited to institute the process anew.

However, if a pattern in the repertoire is detected, a predictive address is calculated from the information in the miss stack and from the sensed pattern. This predictive address is then employed to prefetch from main memory into cache the signal group identified by the predictive address. In the elementary example previously given, if a pattern is sensed in which consecutive operand cache miss operand addresses ABC are consecutive and contiguous, the value of the predictive address, D, will be C+1.

In order to optimize the statistical integrity of the miss stack, the predictive address itself may be placed at the top of the stack since it would (highly probably) itself have been the subject of a cache miss if it had not been prefetched in accordance with the invention.

Since speed of operation is essential, the cache miss prediction mechanism may advantageously be embodied in a "hard wired" form (e.g., in a gate array) although firmware control is contemplated. Consider first a relatively simple hardwired implementation shown in FIG. 3. A miss stack 20 holds the sixteen most recent cache miss addresses, the oldest being identified as address P with entry onto the stack being made at the top. Four four-input electronic switches 21, 22, 23, 24 are driven in concert by a shift pattern signal via line 25 such that: in a first state, addresses A, B, C, D appear at the respective outputs of the switches; in a second state, addresses B, D, F, H appear at the outputs; in a third state, addresses C, F, I, L appear at the outputs; and in a fourth state, addresses D, H, L, P appear at the outputs. Subtraction circuits 26, 27, 28 are connected to receive as inputs the respective outputs of the electronic switches 21, 22, 23, 24 such that: the output from the subtraction circuit 26 is the output of the switch 21 minus the output of the switch 22; the output from the subtraction circuit 27 is the output of the switch 22 minus the output of the switch 23; and the output from the subtraction circuit 28 is the output of the switch 23 minus the output of the switch 24.

Figure 3:
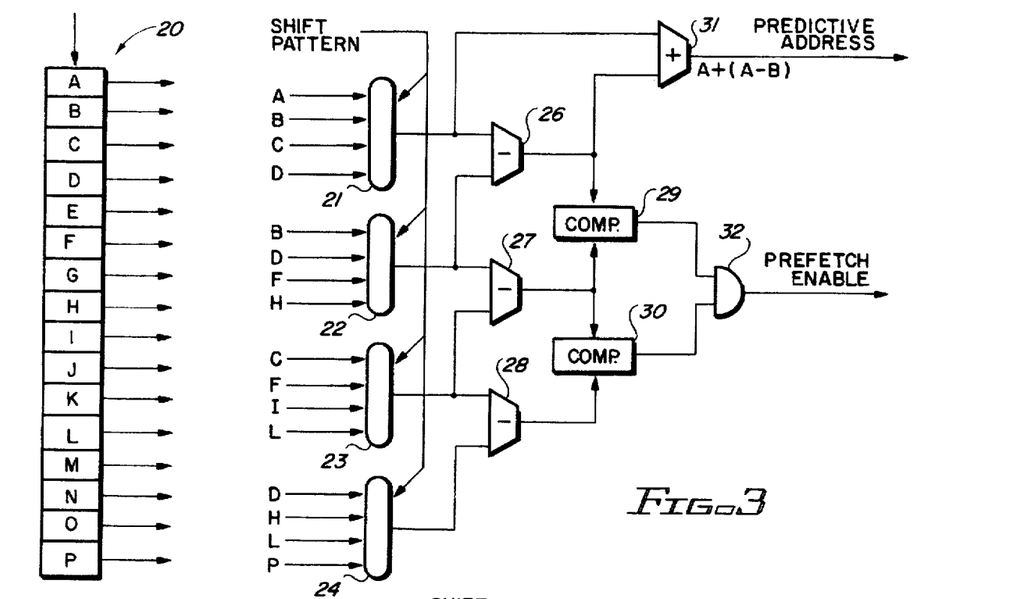
FIG. 3 is a logic diagram of a simple exemplary embodiment of the address prediction mechanism.

The output from the subtraction circuit 26 is applied to one input of an adder circuit 31 which has its other input driven by the output of the electronic switch 21. In addition, the output from the subtraction circuit 26 is also applied to one input of a comparator circuit 29. The output from the subtraction circuit 27 is applied to the other input of the comparator circuit 29 and also to one input of another comparator circuit 30 which has its other input driven by the output of the subtraction circuit 28. The outputs from the comparator circuits 29, 30 are applied, respectively, to the two inputs of an AND-gate 32 which selectively issues a prefetch enable signal.

Consider now the operation of the circuit shown in FIG. 3. As previously noted, miss stack 20 holds the last sixteen cache miss addresses, address A being the most recent. When the request for the signal group identified by address A results in a cache miss, circuit operation is instituted to search for a pattern among the addresses resident in the miss stack. The electronic switches 21, 22, 23, 24 are at their first state such that address A is passed through to the output of switch 21, address B appears at the output of switch 22, address C appears at the output of switch 23 and address D appears at the output of switch 24. If the differences between A and B, B and C, and C and D are not all equal, not all the outputs from the subtraction circuits 26, 27, 28 will be equal such that one or both the comparator circuits 29, 30 will issue a no compare; and AND-gate 32 will not be enabled, thus indicating a "no pattern match found" condition.

The switches are then advanced to their second state in which addresses B, D, F, H appear at their respective outputs. Assume now that (B–D)=(D–F)=(F–H); i.e., a sequential pattern has been sensed in the address displacements. Consequently, both the comparators 29, 30 will issue compare signals to fully enable the AND-gate 32 and produce a prefetch enable signal. Simultaneously, the output from the adder circuit 31 will be the predictive address (B+(B–D)). It will be seen that this predictive address extends the sensed pattern and thus increases the probability that the prefetched signal group will be requested by the processor, thereby lowering the cache miss ratio.

If a pattern had not have been sensed in the address combination BDFH, the electronic switches would have been advanced to their next state to examine the address combination CFIL and then on to the address combination DHLP if necessary. If no pattern was sensed, the circuit would await the next cache miss which will place a new entry at the top of the miss stack and push address P out the bottom of the stack before the pattern match search is again instituted.

Figure 4:
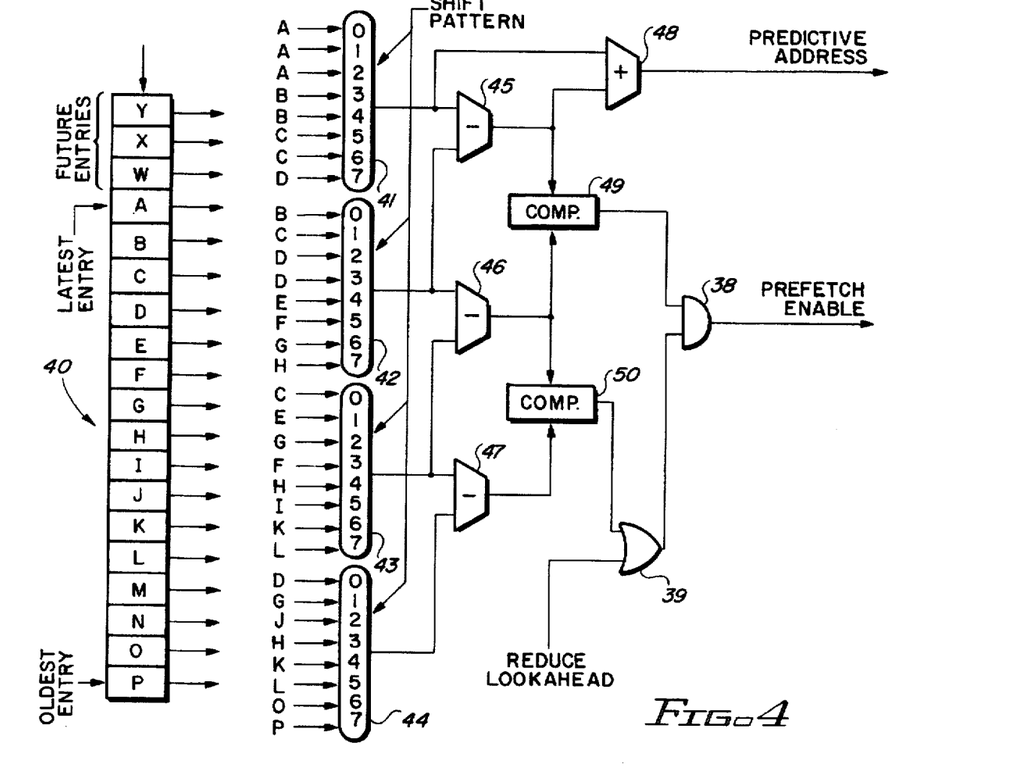
FIG. 4 is a logic diagram of a more powerful exemplary embodiment of the address prediction mechanism.

Consider now the somewhat more complex and powerful embodiment of the cache miss prediction mechanism illustrated in FIG. 4. Electronic switches 41, 42, 43, 44 receive at their respective inputs recent cache miss addresses as stored in the miss stack 40 in the exemplary arrangement shown. It will be noted that each of the electronic switches 41, 42, 43, 44 has eight inputs which can be sequentially selectively transferred to the single outputs under the influence of the shift pattern signal. It will also be noted that the miss stack 40 stores, in addition to the sixteen latest cache miss addresses A–P, three future entries WXY. Subtraction circuits 45, 46, 47 perform the same office as the corresponding subtraction circuits 26, 27, 28 of the FIG. 3 embodiment previously described. Similarly, adder circuit 48 corresponds to the adder circuit 31 previously described.

Comparator circuit 49 receives the respective outputs of the subtraction circuits 45, 46, and its output is applied to one input of an AND-gate 38 which selectively issues the prefetch enable signal. Comparator circuit 50 receives the respective outputs of the subtraction circuits 46, 47, but, unlike its counterpart comparator 30 of the FIG. 3 embodiment, its output is applied to one input of an OR-gate 39 which has its other input driven by a reduce lookahead signal. The output of OR-gate 39 is coupled to the other input of AND-gate 38. With this arrangement, activation of the reduce lookahead signal enables OR-Gate 39 and partially enables AND-gate 38. The effect of applying the reduce lookahead signal is to compare only the outputs of the subtraction circuits 45, 46 in the comparator circuit 49 such that a compare fully enables the AND-gate 38 to issue the prefetch enable signal. This mode of operation may be useful, for example, when the patterns seem to be changing every few cache misses, and it favors the most recent examples.

With the arrangement of FIG. 4, it is advantageous to try all the patterns within pattern groups (as represented by the "YES" response to the ">1 PATTERN GROUP?" query in the flow diagram of FIG. 2) even if there is a pattern match detected intermediate the process. This follows from the fact that more than one of the future entries WXY to the miss stack may be developed during a single pass through the pattern repertoire or even a subset of the pattern repertoire. With the specific implementation of FIG. 4 (which is only exemplary of many possible useful configurations), the following results are obtainable:

| SWITCH STATE | PATTERN | GOAL |
| --- | --- | --- |
| 0 | ABCD | W |
| 1 | ACEG | X |
| 2 | ADGJ | Y |
| 3 | BDFH | W |
| 4 | BEHK | X |
| 5 | CFIL | W |
| 6 | CGKO | X |
| 7 | DHLP | W |

The goal states are searched in groups by switch state; i.e.: Group 1 includes switch states 0, 1, 2 and could result in filling future entries WXY; Group 2 includes states 3, 4 and could result in filling entries WX; Group 3 includes states 5, 6 and could also result in filling entries WX; and Group 4 includes state 7 and could result in filling entry W. When a goal state is reached that has been predicted, the search is halted for the current cache miss; i.e., it would not be desirable to replace an already developed predictive address W with a different predictive address W.

Those skilled in the art will understand that the logic circuitry of FIGS. 3 and 4 is somewhat simplified since multiple binary digit information is presented as if it were single binary digit information. Thus, in practice, arrays of electronic switches, gates, etc. will actually be employed to handle the added dimension as may be necessary and entirely conventionally. Further, timing signals and logic for incorporating the inventive structure into a given data processing system environment will be those appropriate for that environment and will be the subject of straightforward logic design.

Figure 5:
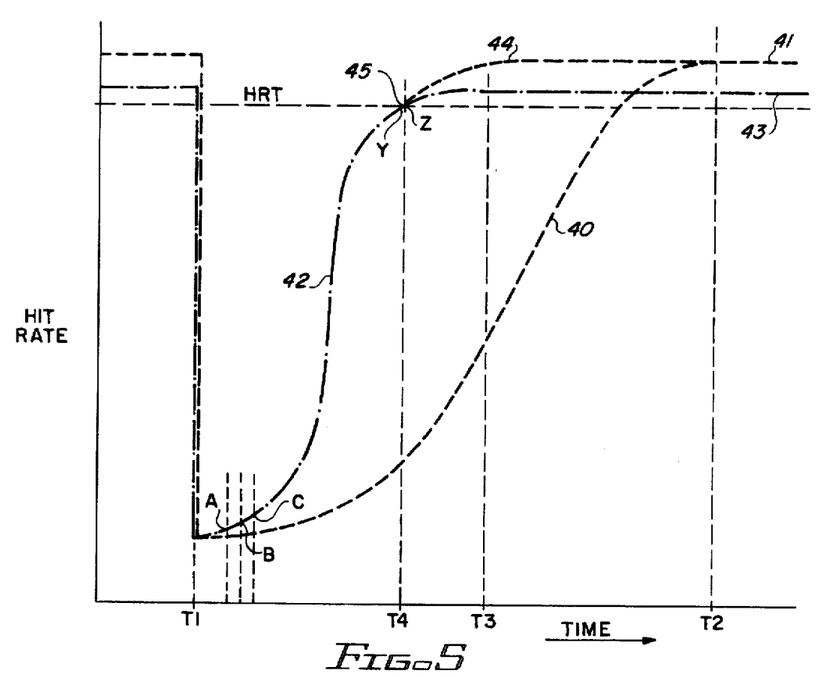
FIG. 5 is a graph showing generalized curves of the cache hit recovery characteristics after a change of process using, not using and selectively using the address prediction mechanism.

Attention is now directed to FIG. 5 which is a time versus hit ratio (also called "hit rate" herein) diagram illustrating the recovery characteristics of a cache memory following a process change. Since most or all the data stored in the cache will typically not be of interest to the new process, a precipitous drop in the cache hit ratio is observed at T1, the instant the new process is started. Assuming first that the cache miss prediction mechanism is not enabled, the recovery follows the representative curve 40 and ultimately stabilizes at a hit ratio represented by the line 41 with which the curve 40 blends at about time T2. (These curves, of course, are highly generalized and idealized. For example, those skilled in the art will understand that the hit ratio represented by the line 41 would not be perfectly straight in practice but rather would transiently vary plus and minus about the line 41.)

Consider now the recovery characteristics of the hit ratio when the cache miss prediction mechanism is enabled. After the precipitous drop in the hit rate observed at T1, recovery takes place along the representative curve 42 which eventually merges with the line 43. Two important aspects of this recovery characteristic will be seen. First, the immediate hit rate recovery is very much faster; i.e., the curve 42 is much steeper (greater rate of increase of hit rate) than the curve 40. Second, the long term stabilized hit ratio represented by the line 43 is somewhat lower than the long term stabilized hit ratio represented by the line 41. For this reason, as discussed above, the cache miss prediction mechanism is very effective shortly after a process change, but its application can be detrimental to the long term hit ratio.

By the use of the present invention, the accelerated recovery following a process change obtained by the use of the cache miss prediction mechanism and represented by the curve 42 may be enjoyed for long term processes while also enjoying the higher long term hit ratio represented by the line 41. Fundamentally, this result is achieved by enabling the cache miss prediction mechanism immediately following a process change and disabling it at some time when the cache has recovered to a hit ratio near that of stabilization along the line 43. This procedure is represented by the curve 44 which couples the point 45 (at which the cache miss prediction mechanism is disabled) along the line 42 to the line 41. The trigger mechanism for selectively enabling the cache miss prediction mechanism may be either a predetermined time period extending in the example from T1 to T4 or the time between T1 and the time at which a predetermined hit ratio, represented by the line HRT (hit ratio threshold), is reached. In FIG. 5, the crossover points are the same merely for purposes of illustration.

Figure 6:
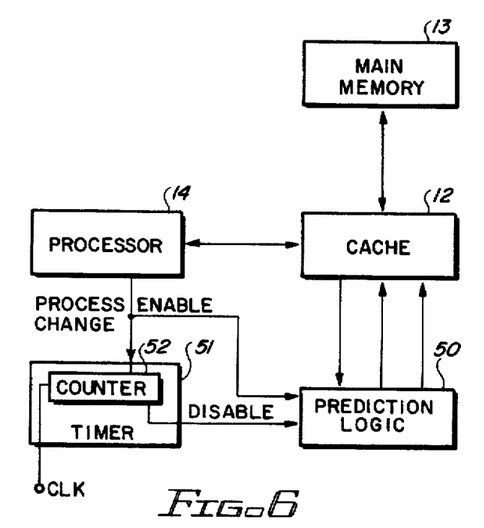
FIG. 6 is a block diagram of a first embodiment of the invention.

Referring now to FIG. 6, exemplary apparatus for establishing the period T1–T4 during which the cache miss prediction mechanism is enabled is shown. When the processor 14 calls for a new process, it alerts a timer 51 which includes a presettable counter 52 and also enables the cache miss prediction logic 50 (e.g., the logic of FIG. 3 or FIG. 4). While enabled, the prediction logic 50 functions as previously described in concert with the processor 14, cache 12 and main memory 13.

In its most elementary form, the counter 52 in the timer 51 is simply preset to a first fixed predetermined number when the "process change" signal is received from the processor 14 and then clocks to a second fixed number (typically zero or −1) whereupon a "disable" signal is issued to the prediction logic 50 to permit the cache to ascend to its best hit ratio after the cache inrush has been handled by the prediction logic. Alternatively, and preferably, the "process change" signal includes count information predetermined for the new process which sets the counter 52 to an initial count which optimizes the time period during which the prediction logic 50 is enabled for that specific process. Thus, the new process itself specifies the time period during which the cache miss prediction mechanism is enabled. This initial count may be predetermined simply from experience with a given process or family of processes. Thus, the new process itself specifies the time period during which the cache miss prediction mechanism is enabled.

Figure 7:
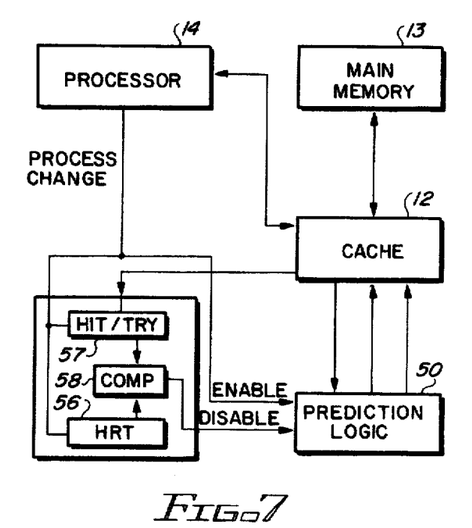
FIG. 7 is a block diagram of a second embodiment of the invention.

FIG. 7 shows the similar structure by which the determination of the shift from curve 42 to curve 44 at exemplary point 45 may be made in accordance with the attainment of a predetermined HRT along the curve 42. The logic block 55 includes a division circuit 57 which receives from the cache 12 a series of "snapshots" along the curve 42 (FIG. 5) of the tries and hits, each taken during a brief period. For example, the period between point "A" and point "B" may be one such period; the period between point "B" and point "C", the next, and so on. Each hit ratio calculated by the divider 57 is compared to a hit ratio threshold stored in sub-block 56 by comparator 58. When the calculated instantaneous hit ratio reaches the hit ratio threshold (e.g. during the period between point "Y" and point "Z" along the curve 42), the comparator 58 issues the "disable" signal to the prediction logic 50 such that the hit ratio will ascend along the curve 44.

The hit ratio threshold stored in the sub-block 56 may be a fixed predetermined number or it may be a predetermined number received from the processor 14 in conjunction with the "process change" signal which reflects a hit ratio switchover point optimized for that specific process. Thus, the new process itself specifies the hit ratio threshold at which the cache miss prediction mechanism will be disabled. In some caches, the instantaneous hit ratio is routinely calculated such that the sub-block 57 need only receive the information for comparison with the hit ratio threshold rather than actually calculating it; in some other systems, the processor tracks the instantaneous hit ratio. It will therefore be understood that this calculation can be carried out by any convenient component in a given system and that the block 55 is only an exemplary embodiment of apparatus for performing this task.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. An operand address prediction procedure for selectively predicting operand request addresses from historic cache miss addresses practiced in a data processing system incorporating a processor for running successive processes, a cache memory and a main memory, the procedure comprising the computer-implemented steps of:

during the system hardware, firmware and software design procedure, performing the preliminary step of:
A) establishing a first in, first out miss stack for storing a plurality of cache miss addresses by employing at least a selected one of hardware, firmware and software design and implementation techniques; and, during system operation, performing the following steps within the system:
B) waiting for a cache miss resulting from the absence in the cache of called information requested of the cache;
C) when a cache miss occurs, placing the address of the called information onto the top of the miss stack;
D) selecting, from among a plurality of pattern groups comprising a pattern repertoire, a current pattern group;
E) examining the cache miss addresses resident in the miss stack for a match with a selected address pattern in the current pattern group;
F) if the selected pattern is not matched, determining if all the patterns in the current group have been examined;
G) if all the patterns in the current pattern group have not been examined, selecting, from the current pattern group, a different pattern than the pattern last examined and returning to step E);
H) if all the patterns in all the groups in the pattern repertoire have been searched, returning to step B);
I) if all the patterns in the current pattern group have been examined, assigning a new pattern group, different from the pattern group last examined, as the current group, selecting a pattern from the new current group and returning to step E); and J) if the selected pattern is matched:
1) using the matched pattern and at least one of the addresses in the miss stack to calculate a predictive address pointed to a signal group stored in the main memory;
2) prefetching into cache memory from the main memory the signal group identified by the predictive address; and
3) assigning another group as the current group and returning to step E);

wherein said procedure of said steps B through J is performed only during intervals which commence immediately after a process change and terminate upon the first occurence of a succeeding predetermined event, which predetermined event occurs after the maximum rate of increase in the operative hit rate of said cache memory is reached following said process change.

2. The system of claim 1 in which the operand address prediction procedure is disabled at the end of a predetermined period which begins when a new process is commenced.

3. The system of claim 2 in which the predetermined period is specified by the new process.

4. The system of claim 1 in which the operand address prediction procedure is disabled when a predetermined instantaneous cache hit ratio is reached.

5. The system of claim 4 in which the predetermined cache hit ratio is specified by the new process.

6. In a data processing system including a processor for running successive processes, a cache memory, a main memory and an operand address prediction mechanism for developing a predictive address for prefetching operands, each identified by an address, from the main memory into the cache memory, which operand address prediction mechanism comprises a first mechanism including:
A) a first in, first out stack for storing a plurality of addresses representing cache misses;
B) a plurality of electronic switch means each having a plurality of address inputs and a single address output;
C) means coupling said addresses stored in said stack individually to said electronic switch means inputs in predetermined orders;
D) means for switching said electronic switch means to transfer said addresses applied to said electronic switch means inputs to said electronic switch outputs to establish at said electronic switch outputs predetermined combinations of said addresses;
E) at least two subtraction circuit means, each said subtraction circuit means being coupled to receive a unique pair of addresses from said electronic switch means outputs and to issue a value representing the displacement therebetween;
F) at least one comparator circuit means coupled to receive a pair of outputs from a corresponding pair of said subtraction circuit means and responsive thereto for issuing a prefetch enable logic signal if there is a compare condition;
G) predictive address development means adapted to combine one of said addresses appearing at one of said electronic switch outputs and displacement information appearing at one of said subtraction circuit means to obtain a predictive address;

whereby, the coordinated presence of said predictive address and said prefetch enable logic signal causes a signal group identified by said predictive address to be prefetched from said main memory into said cache memory; and
a control circuit coupled to said first mechanism for enabling said first mechanism to operate only during intervals which commence immediately after a process change and terminate upon the first occurence of a succeeding predetermined event, which predetermined event occurs after the maximum rate of increase in the operative hit rate of the cache memory is reached following said process change.

7. The system of claim 6 in which said first mechanism is disabled at the end of a predetermined period which begins when a new process is commenced.

8. The system of claim 7 in which said predetermined period is specified by the new process.

9. The system of claim 6 in which said first mechanism is disabled when a predetermined instantaneous cache hit ratio is reached.

10. The system of claim 9 in which said predetermined cache hit ratio is specified by the new process.

11. An operand address prediction procedure for selectively predicting operand request addresses from historic operand cache misses practiced in a data processing system incorporating a processor for running successive processes, a cache memory, a main memory and a data stack, said procedure comprising the computer-implemented steps of:
A) waiting for an operand cache miss resulting from the absence in the cache of a called operand requested of said cache memory;
B) when an operand cache miss occurs, entering the address of the called operand on the top of said stack;
C) examining said stack for an address pattern among the operand miss addresses resident therein following step B);
D) if a pattern is not matched, returning to step A; and
E) if a pattern is matched:
1) using the matched pattern and at least one of the addresses in said stack to calculate a predictive address pointing to a signal group stored in said main memory;
2) prefetching into said cache memory from said main memory the signal group pointed to by said predictive address; and
3) returning to step A); wherein said procedure of said steps A–E is performed only during intervals which commence immediately after a process change and terminate upon the first occurence of a succeeding predetermined event, which predetermined event occurs after the maximum rate of increase in the operative hit rate of said cache memory is reached following said process change.

12. The procedure of claim 11, wherein said predetermined event occurs at the end of a predetermined period following said process change.

13. The procedure of claim 12 wherein said predetermined period is determined by the process commencing execution following said process change.

14. The procedure of claim 11, wherein said predetermined event occurs when said operative hit rate reaches a predetermined value.

15. The procedure of claim 14, wherein said predetermined value is determined by the process commencing execution following said process change.

16. The procedure of claim 11 wherein said procedure comprises the additional step preceding step A of:
during the design procedure for the system comprising said processor, cache memory, main memory and data stack, establishing said stack as a first in, first out stack for storing a plurality of said addresses of called operands; and
performing steps A–E during system operation.

17. The method for predicting operand addresses of operand requests in a data processing system in which a cache thereof is repeatedly interrogated to determine whether an address corresponding to a request operand address is stored therein, which stored operand address corresponds to an operand also stored in said cache; wherein said data processing system includes a main memory and a stack for holding addresses; said method being carried out by said data processing system in operating said cache, characterized by the computer-implemented steps of:

A) upon the occurence of a cache miss when an operand is requested from said cache, entering the request operand address into said stack;

B) examining the request operand addresses present in said stack to determine whether one of a plurality of predetermined operand address patterns is represented by said request operand addresses; and C) (1) if no one of said patterns is determined to be represented in step (B), returning to step (A), but
  (2) (i) if one of said patterns is determined to be represented in step (B), generating an operand address of a predicted operand request,
    (ii) using said generated operand address to obtain an operand from said main memory and write such operand into said cache, and
    (iii) returning to step (A); wherein said method of steps A–C is performed only during intervals which commence immediately after a process change and terminate upon the first occurence of a succeeding predetermined event, which predetermined event occurs after the maximum rate of increase in the operative hit rate of said cache is reached following said process change.

18. The method of claim 17, further characterized by:

in step C(2), said operand address is generated by performing a calculation using said one predetermined pattern and one of said request operand addresses present in said stack.

19. The method of claim 18, wherein said stack is a first in-first out stack, further characterized by:

in step (A), said request operand address is entered on the top of said stack.

20. Apparatus for controllably generating a predicted operand address of an operand request in a data processing system in which a cache thereof is repeatedly interrogated to determine whether an address corresponding to a request operand address is stored therein, which stored operand address corresponds to an operand also stored in said cache; wherein said data processing system includes a store for holding a plurality of said addresses in respective cells thereof; said apparatus being characterized by:

a controllable operand address prediction mechanism comprising:
  a plurality of switches, each of said switches having a plurality of input terminals, an output terminal and a control terminal, whereby a control signal applied to said control terminal causes said switch to couple one of said input terminals to said output terminal; said control signal being delivered to said control terminals to cause the input terminals of said switches to be successively coupled to said output terminals;
  a circuit coupling each of said input terminals of said switches to one of said cells;
  a plurality of first arithmetic circuits, each of said first arithmetic circuits having a pair of input terminals and an output terminal, the input terminals of each of said first arithmetic circuits being coupled to the respective output terminals of two of said switches, each of said first arithmetic circuits performing an arithmetic operation on the two addresses received by its input terminals from the two cells of said store coupled to said input terminals by said two switches and delivering a signal at its output terminal which represents the result of said arithmetic operation;
  a plurality of comparators, each of said comparators having a pair of input terminals and an output terminal, the input terminals of each of said comparators being coupled to the respective output terminals of two of said first arithmetic circuits, each of said comparators comparing the two arithmetic result signals received thereby and delivering a signal at its output terminal denoting whether said result signals are alike;
  a second arithmetic circuit having a pair of input terminals and an output terminal, a first input terminal of said second arithmetic circuit being coupled to the output terminal of one of said switches and the second input terminal of said second arithmetic circuit being coupled to the output terminal of one of said first arithmetic circuits, said second arithmetic circuit performing an arithmetic operation on the address received by said first input terminal and the arithmetic result represented by the signal received by said second input terminal and delivering an output signal at its output terminal which represents the result of said arithmetic operation performed by said second arithmetic circuit;
  whereby when the signals delivered at the output terminals of all of said comparators denote that the compared arithmetic results are alike, the arithmetic result represented by the concurrent output signal of said second arithmetic circuit represents said predicted operand request address; and
  a control circuit coupled to said prediction mechanism for enabling said prediction mechanism to operate only during intervals which commence immediately after a process change and terminate upon the first occurence of a succeeding predetermined event, which predetermined event occurs after the maximum rate of increase in the operative hit rate of said cache is reached following said process change.

21. The method for predicting operand addresses of operand requests in a data processing system in which a cache thereof is repeatedly interrogated to determine whether an operand address corresponding to a requested operand is stored therein, said cache storing operands and their corresponding operand addresses; wherein said data processing system includes a main memory; said method being carried out by said data processing system in operating said cache, characterized by the computer-implemented steps of:

A) upon the generation of and interrogation of said cache by a request operand address, B) determining whether a plurality of earlier-generated request operand addresses correspond to one of a plurality of predetermined operand address patterns, and C) (1) if no one of said patterns is determined to correspond to said plurality of request operand addresses in step (B), returning to step (A), but
  (2) (i) if one of said patterns is determined to correspond to said plurality of request operand addresses, generating an operand address of a predicted operand request using said one pattern,
    (ii) obtaining the operand from the main memory location represented by said predicted operand address and writing said operand into said cache, and (iii) returning to step (A), wherein said method of steps A–C is performed only during intervals which commence immediately after a process change and terminate upon the first occurence of a succeeding predetermined event, which predetermined event occurs after the maximum rate of increase in the operative hit rate of said cache is reached following said process change.

22. The method of claim 21, wherein said steps A–C are disabled at the end of a predetermined period which begins when a new process is commenced.

23. The method of claim 21, wherein said steps A–C are disabled when a predetermined cache hit rate is reached.

24. The method of claim 21, wherein said predetermined event occurs at the end of a predetermined period following said process change.

25. The method of claim 24, wherein said predetermined period is determined by the process commencing execution following said process change.

26. The method of claim 21, wherein said predetermined event occurs when the operative hit rate reaches a predetermined value.

27. The method of claim 26, wherein said predetermined value is determined by the process commencing execution following said process change.

* * * * *